United States Patent [19]

Hill

[11] 4,435,458
[45] Mar. 6, 1984

[54] LAMINATE FOR WEARING APPAREL AND METHODS FOR THE MANUFACTURE OF THE LAMINATE

[75] Inventor: Charles E. Hill, Coshocton, Ohio

[73] Assignee: Becton, Dickinson and Company, Paramus, N.J.

[21] Appl. No.: 452,222

[22] Filed: Dec. 22, 1982

[51] Int. Cl.³ .................... B32B 3/26; B32B 33/00
[52] U.S. Cl. .................... 428/91; 156/196; 156/220; 428/152; 428/213; 428/219; 428/304.4; 428/319.7
[58] Field of Search .......... 156/196, 220; 428/91, 428/152, 213, 219, 304.4, 319.7

[56] References Cited

U.S. PATENT DOCUMENTS

| 3,810,808 | 5/1974 | Anderson | 428/304.4 |
| 3,956,783 | 5/1976 | Stoller | 428/91 |
| 4,305,985 | 12/1981 | Heublein | 428/91 |

*Primary Examiner*—William J. Van Balen
*Attorney, Agent, or Firm*—Robert P. Grindle

[57] ABSTRACT

Methods are provided for producing a laminate particularly useful in producing warm moisture-resistant wearing apparel for industrial applications and sportswear. The laminate is superior in flexibility and comfort when worn while still providing appropriate moisture protection. In addition, the method includes procedures for providing a combined textured and creped surface for varying the appearance and degree of flexibility and "feel" to garments comprised of the laminate. The methods include joining a non-woven fibrous web such as a needled felt to a foamed synthetic resin web, such as polyurethane foam, and thereafter, through controlled tension, temperature and roll pressure, joining a film, such as a synthetic resin film, to the exposed foam surface through a heated roll nip, followed by embossing. The degree of "crepe" and texture or embossing imparted to the laminate varies inversely to each other, as desired, to provide a variety of different appearing and appealing fabric surfaces.

32 Claims, 5 Drawing Figures

LAMINATE FOR WEARING APPAREL AND METHODS FOR THE MANUFACTURE OF THE LAMINATE

BACKGROUND AND STATEMENT OF THE INVENTION

This invention relates to methods for producing a laminate useful in the manufacture of wearing apparel, and particularly wearing apparel for use in a work environment, such as hats, bib overalls, jackets and rainwear, or in a sports environment where the combined properties of warmth, moisture resistance and flexibility are desirable. The laminate includes an attractive textured surface with the texture thereof being a combination of a "crepe" and an embossed pattern, which combination may be varied to vary the appearance of the resulting wearing apparel produced. The crepe and the pattern vary inversely, as desired and may be produced by the controlled method of the invention. By varying the pressure, temperature and tension of the various webs forming the laminate through a heated roll nip, the crepe and softness of the resulting laminate may be increased or reduced, as desired. The embossing which provides the pattern may also be varied to increase or decrease the crepe appearance of the resulting surface, together with the "feel" or softness of the resulting laminate.

The invention includes joining a non-woven fibrous web, which may be a non-woven polyester, for example, to a synthetic foamed resin material, such as polyurethane. The joining may be needling the two webs together. Subsequently, the joined web is joined to an additional film web which provides the outer surface of the laminate. The film may be a soft flexible polyvinyl chloride film, for example, and it is joined through a heated roll nip to the exposed foam web surface of the combined fibrous web-foam laminate. Once the film is joined to the foamed surface, the combined laminate is embossed in an embossing roll nip to provide a degree of pattern to the resulting outer surface of the wearing apparel formulated from the laminate of the invention.

Various approaches have been utilized in the past for producing laminates useful for wearing apparel of the kind to which this invention is directed. That is, arrangements have been made in the past for producing laminates which have a warmth or comfort factor in combination with a moisture impervious outer surface, and in some cases a textured surface for various applications. However, in these procedures, the laminate is formulated into a particular kind of wearing apparel and subsequently, the outer surface is applied in the form of a liquid to the wearing apparel by dipping or knifing procedures. Both of these procedures require substantial production lines in order to accommodate the handling of the liquid application as the final application for such laminates. Moreover, control of the coating appearance and properties is more difficult.

With this invention, by contrast, a laminate is provided for the subsequent production of wearing apparel for use in industrial or sports applications in particular wherein it is important to provide comfort and flexibility in combination with a moisture resistant property. Moreover, precise control is obtained in providing a desired patterned and/or creped surface, as desired. For example, for rainwear, it may be important that the laminate be less flexible with less texture on the surface, while with ski leggings it may be more important to have a higher degree of comfort and flexibility and "feel" to the garment. In addition, in each of these applications it may be important for style and design purposes to have a greater or lesser degree of pattern, as desired. In both cases, these different properties may be obtained easily with the invention herein by simply varying the degree of heat, tension, pressure and temperature in accordance with the invention here in the joining together of the various webs making up the laminate of the invention.

Initially, a non-woven web is needled to a foam web. It will be understood, however, that other joining procedures may be used including, for example, flame bonding and adhesive bonding. Also, other webs may be used including webs of woven or knit fibers. The selection will depend upon the ultimate use of the laminate, as will be understood by practitioners in the art.

The non-woven web surface in this joined together pre-laminate will be the internal surface of the resulting garment. In some applications, it is better that this non-woven web exposed surface have a greater degree of loft or fuzziness to it for providing the feeling of warmth for certain wearing apparel. In other instances, it is better that it have a lesser loft for a harder, more wear resistant surface for certain applications, such as overalls. Because of this, the number and extent of penetrations, if a needing procedure is used, and the denier of the fiber during the needling procedure will have an effect upon the resulting surface texture of the internal surface of the resulting garment made of the laminate of the invention. Also, the degree of feel or texture or softness to this surface may be varied in subsequent procedures, as will be discussed below.

Subsequent to the joining together of the fibrous web and the foam web to form the prelaminate, as discussed above, a film is applied to the foam surface of that joined together web. The film may be comprised of a soft flexible synthetic resin material. Preferably, in the production line for forming the laminate the film will pass through a vinyl plastisol adhesive liquid material in the line prior to the film being applied to the foam surface of the pre-laminate web.

In considering generally the conditions for carrying out the method of the invention here for producing the laminate of the invention here, one may note that it is preferable to use a synthetic non-woven web such as a polyester for the internal surface of the laminate. Preferably, the foam web utilized which is needled to the non-woven polyester web is a polyurethane foam. The polyester web will be selected to have a weight within the range of between about 2.5–4.5 ounces per square yard, while a 3.0 ounce per square yard weight is preferred. With respect to the polyurethane foam, it will be selected to have a thickness within the range of between about 0.10 and 0.03 inches, and preferably 0.03 inches in thickness. With respect to the film applied to the polyurethane foam surface, preferably it will have a thickness within the range of 0.002–0.02 inches, and preferably 0.006 inches in thickness.

In considering further the general conditions for carrying out the method herein, the non-woven polyester web may be joined to the polyurethane foam web in a conventional needle punching machine, such as a Hunter Fiber-Locker (TM) machine. The depth of penetration will be within the range of between about 0.20 and 0.92 inches and preferably 0.3 to 0.4 (two barbs) inches. The density of penetration will be within the range of between about 200 and 2000 penetrations per square inch and preferably 550.

Thereafter, the roll of combined polyester, polyurethane foam pre-laminate, and a roll of soft flexible polyvinyl chloride film are mounted in a line for joining the two together in the nip of a heat drum and a lay-on roll. The line speed during such a combining operation is within the range of 2 and 22 yards per minute, and preferably 22 yards per minute. That is, the material exiting from the roll nip will be at the rate of 22 yards per minute. The polyester-polyurethane foam laminate is fed to the heated roll nip at minimum operating tension approaching zero with the applied tension being only that necessary to maintain the web in proper alignment for feeding to the roll. The film tension is controlled so that the film is stretched in length about 6 percent during and subsequent to its passage through the roll nip. It is important during this procedure to monitor the film supply roll tension because a roll of larger quantity will increase in momentum during revolution in comparison to a roll of less quantity having a smaller diameter.

The combined laminates are passed into the nip of a heated drum being maintained at a temperature of within the range of 265°–315° F. The pressure roll operating in combination with the heated drum, in order to form the nip, will be set to a very low pressure application against the heated drum. Again, this degree of pressure will be approaching zero. It is important, in this respect, to allow the polyurethane surface of the laminate and the film being joined together to relax relative to each other in order to provide a "crepe" appearance while still applying sufficient pressure to assure lamination. Any degree of pressure greater than that necessary to provide a lamination in the nip between the two rolls will reduce or prevent the relaxation necessary in order to create the crepe surface. The heated drum will be within the range of 30–36 inches in diameter while the lay-on pressure roll will be preferably within the range of 6–8 inches in diameter.

With the lay-on roll pressure applied to the heat drum being that necessary to formulate a nip for the laminate and film passing therethrough, the amount of pressure will be selected to formulate the degree of creping desired in the resulting laminate on the surface thereof while the temperature of the heated drum is selected to bring about an acceptable degree of lamination. That is, the film and the foam appear to react to the operating conditions in the nip to varying degrees. There appears to be less relaxation in one than the other resulting in the crepe appearance. This response is, of course, related, also, to the relative tension in the two webs, Nevertheless, a higher degree of creping occurs at lower temperatures and the variation is inverse. Thus, if it is desired to have a high degree of creping to the resulting surface, a lower temperature will be selected within the range noted above. Preferably, a temperature of about 315° F. is used to provide a moderate degree of creping.

With the invention here, subsequent to the joining of the film to the polyurethane foam surface and the resulting creping thereof, the resulting laminate passes through an embossing roll to provide an additional appearance property to the resulting surface. The resulting surface may be in the form of minute parallel crevices across the creped surface. The embossing roll pressure is within the range of 100–400 psi, and preferably about 200 psi. The pressure must not be so high as to overcome the desired "crepe" appearance of the web passing through the embossing roll. By the same token, if a lesser degree of crepe is desired together with a more uniform patterned surface, a higher degree of pressure will be utilized. In either case, the resulting appearance of the web is an attractive patterned surface which may have different variations of texture and crepe, as desired. Other features which may be included in the appearance of the laminate herein include a wet look, for example, for rainwear and like garments. This will be controlled to some extent by the selection of the resin film utilized. As will be appreciated, further, the film selected may have incorporated therein different dyes to impart different colors to the resulting textured surface.

A further important feature of this invention is the fact that controlling the embossing roll pressure has an effect upon the softness of the internal surface of the resulting web. That is, the "fuzzy" fibrous exposed internal surface or loft of the laminate may have a lesser degree of loft if a higher pressure is utilized in the embossing roll nip. Higher pressures have the effect of compacting the individual fibers making up the fibrous web surface, while lower pressures provide less compacting and a softer "feel" to the resulting garments produced from the laminate herein. As will be appreciated, this is important if the garment is worn against the skin.

As purely illustrative of materials which may be utilized in the method of the invention here, a combined web of non-woven polyester having a weight of 3.0 ounces per square yard needled to a polyurethane foam having a thickness of 0.03 inches may be obtained from Foss Manufacturing Company Inc. Haverhill, Mass. The combined laminate is designated OFI530. The film used for the laminate herein may be a soft flexible polyvinyl chloride film obtained from Oxydental Chemical Company and designated OXY #1053-191. A representative color designation for the film may be F-4372-4 which is a bright yellow useful in rainwear which might be utilized in situations where the wearer may be in a dangerous environment, such as traffic control policemen or firemen on duty. Hats, jackets and bib overalls may also be of a bright yellow color in construction sites for the purpose of protection. Of course, other fibrous webs may be used of natural or synthetic fibers or a combination of the two. Also, the webs may be knitted or woven. Other synthetic foamed resins may be substituted for the polyurethane, as well, and other film materials of synthetic materials, including polypropylene and polyethylene. Other colors and combinations of colors will be selected, as will be understood, for producing attractive sports apparel.

Other objects and advantages of this invention will be apparent from the following description, the accompanying drawings, and the appended claims.

DETAILED DESCRIPTION OF THE INVENTION

Figure 1:
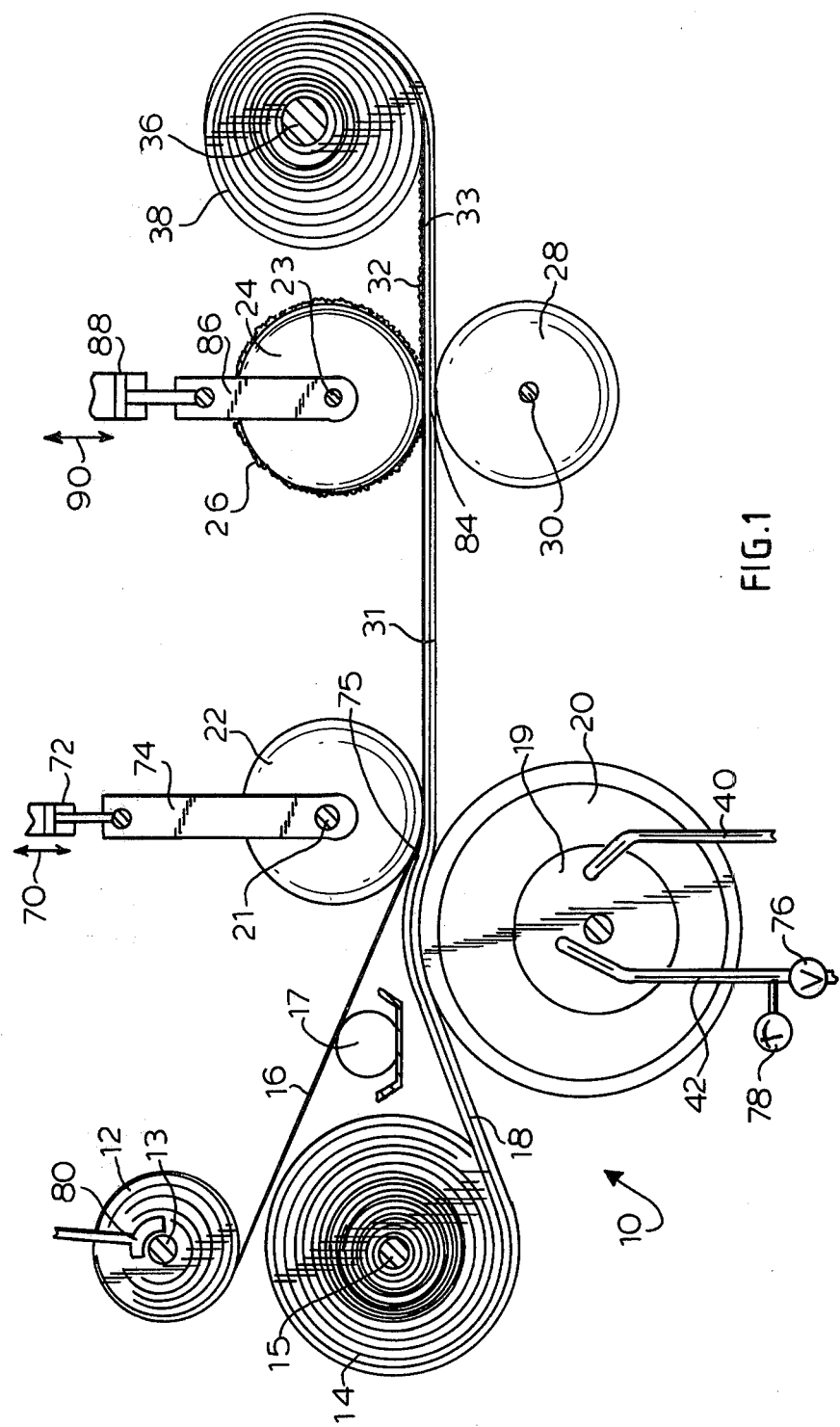
FIG. 1 is a somewhat diagrammatic illustration of a production line for use in the method of the invention.

Referring to the drawings in which like reference characters refer to like parts throughout the several views thereof, 10 designates generally a schematic showing of a production line for carrying out the method of the invention here. Thus, supply roll 14 is a roll of the pre-laminate of the invention formed from a fibrous web such as a non-woven polyester needled to a foam web, such as a polyurethane foam. As shown in FIG. 1, supply roll 14 is mounted for rotation on mandrel 15. Supply roll 12 of the film forming the outer surface of the laminate of the invention is shown mounted on mandrel 13. A web 16 of the film extends from supply roll 12 to the nip 75 formed between the heated drum 20 and the lay-on roll 22. A web 18 extends from supply roll 14 to nip 75. 17 is a liquid adhesive applicator for film 16.

The lay-on roll 22 is mounted for rotation on mandrel 21 which is in turn supported from a vertical support 74. As will be appreciated, lay-on roll 22 is mounted on its support 74 for vertical movement in the direction of arrow 70 for applying varying degrees of pressure of lay-on roll 22 at nip 75 against the surface of heated drum 20. As further shown in FIG. 1, heated drum 20 is mounted for rotation on mandrel 19 and has a supply line 42 and a return line 40 for supplying steam to the fixed central mandrel 19 of drum 20 for heating the drum. Supply line 42 includes a valve 76 and a temperature indicating meter 78 for controlling the temperature level of drum 20. A break arrangement is provided at 80 for mandrel 13 for film supply roll 12 in order to control the tension of the web 16 being fed to nip 75 in order to provide the desired increase in length of web 16 between the time of leaving roll 12 as web 16 and being wound on roll 38 as web 33. Embossing roll 24 is mounted on mandrel 23 which in turn is supported on a vertical support 86. Embossing roll 24 is movable vertically under the action of reversible pressure cylinder 88 in the direction of arrow 90 in order to control the pressure of embossing roll at nip 84. Embossing roll 24 includes an embossed surface 26 for imparting a desired pattern to the surface 32 of web 33. Once the treatment has taken place, web 33 is collected on mandrel 36 to form the take-up roll 38 of the final product.

Figure 2:
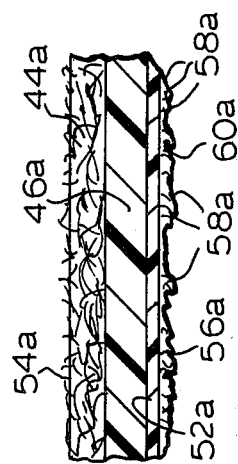
FIG. 2 is a sectional view of a pre-laminate produced in accordance with the method of the invention.
Figure 3:
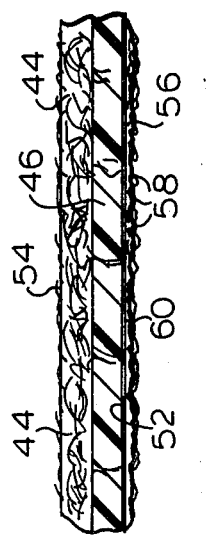
FIG. 3 is a sectional view of the laminate of the invention with the film applied to the polyurethane surface and produced in accordance with the method of the invention here.

Referring now to FIG. 2, the pre-laminate is shown in which the non-woven web 44 is needled to the foam 46 by needles 48 with the laminate moving in the direction of arrow 50. The surface 54 is the internal surface of the ultimate laminate of the invention and is a nap-like surface of varying degree of loft, as discussed above. The exposed surface 52 of the foam layer 46 has applied thereto a film layer 56, as shown in FIG. 3. During passage through the nip 75, (FIG. 1) the variation in the degree of temperature applied together with the variation in the tension of the prelaminate formed of the non-woven web 44-foam 46 and the subsequently applied film 56 provides the creping action 58 to the surface of film 56. Subsequently, when the laminate passes through the embossing roll, the embossing pattern 60 is formed.

Figure 4:
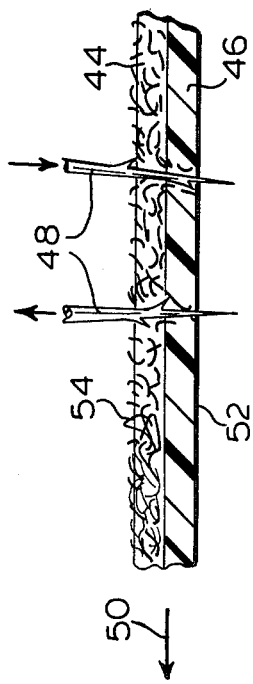
FIG. 4 is a sectional view of the laminate of the invention produced in accordance with the method of the invention and similar to the view shown in FIG. 3 but with the resulting laminate shown illustrating a laminate with less embossing pressure applied.

Referring now to FIG. 4, a laminate similar to that shown in FIG. 3 is shown. However, in this figure a laminate is shown in which the embossing roll pressure applied to the final web is substantially reduced. This has the effect of reducing the suppression of the crepe pattern 58a on the surface of film 56a. Moreover, the pre-laminate webs are less compressed and there is an increased loft 54a on the interior surface of the resulting laminate. This particular laminate is representative of a softer more flexible web, as desired, produced in accordance with the invention here.

Figure 5:
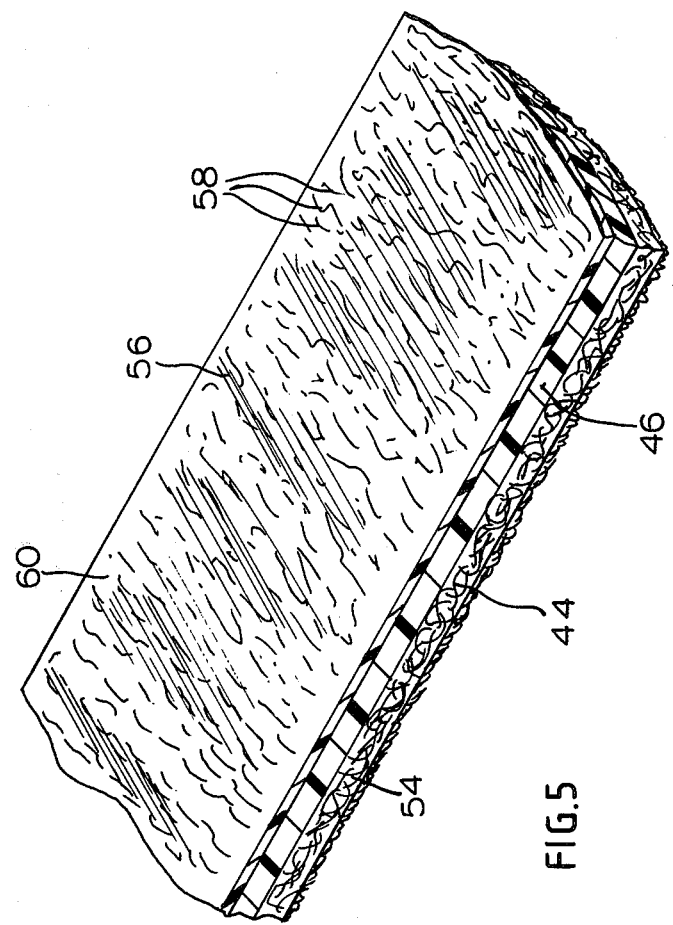
FIG. 5 is a perspective view of a section of a sheet of the laminate of the invention.

Referring now to FIG. 5, a perspective view of a section of a laminate sheet of the invention is shown illustrating the general surface characteristics of the laminate of the invention including the combined textured pattern 60 and crepe pattern 58 on the film 56.

While the methods and products herein disclosed form preferred embodiments of the invention, this invention is not limited to those specific methods and products, and changes can be made therein without departing from the scope of the invention, which is defined in the appended claims. For example, as will be appreciated by practitioners-in-the-art, various different films may be selected for the outer surface of the laminate of the invention which characteristics in and of themselves will result in a different response to the method of the invention here of the creping action followed by the imposition to the crepe surface of the varying amounts of pressure for varying degrees of texture and pattern to that surface. It will be appreciated further, that various embossing rolls may be utilized having different configurations thereover for embossing a different form of pattern superimposed upon the initial creping to the outer surface of the laminate. Obviously, selections may be made from the film relative to the degree of color and the sheen of the resulting surface for different applications of the laminate of the invention.

What is claimed is:

1. A method for producing a laminate useful in wearing apparel, comprising
   (a) selecting in a first selecting step a fibrous web;
   (b) selecting in a second selecting step a web of foamed resin;
   (c) joining said fibrous web to said foamed resin web to form a pre-laminate; the improvement characterized by
   (d) selecting in a third selecting step a resin film web;
   (e) adhering said film web to the exposed foam surface of said pre-laminate formed in said joining step by passing said film and said pre-laminate through a pressure nip at elevated temperatures;
   (f) creping the said film web in said pressure nip during said adhering step by maintaining said film web, prior to said nip under sufficient tension to elongate said web;
   (g) said creping step being carried out by maintaining said pre-laminate web at only enough tension, prior to said nip, to guide said pre-laminate to said nip; and
   (h) the pressure in said pressure nip, during said creping step being only at a level to bring the surfaces of said film web and said pre-laminate web together.

2. The method of claim 1, further characterized by
   (a) said creping step being carried out at a temperature within the range of between about 265 degrees and 315 degrees F.

3. The method of claim 2, further characterized by (a) the step of embossing said web from said creping step at elevated pressures.

4. The method of claim 3, further characterized by
(a) said elevated pressure is within the range of between about 100 and 400 pounds per square inch.

5. The method of claim 4, further characterized by
(a) said creping step is carried out at a temperature of 315 degrees F.; and
(b) said embossing step is carried out at a pressure of 200 pounds per square inch.

6. The method of claim 5, further characterized by
(a) said web for said first selecting step is non-woven polyester;
(b) said foam for said second selecting step is polyurethane; and
(c) said film for said third selecting step is polyvinyl chloride.

7. The method of claim 1, further characterized by
(a) said creping step is carried out by maintaining said film web under sufficient tension to produce an elongation thereof of six percent in the resulting laminate.

8. The method of claim 1, further characterized by
(a) said first selecting step is carried out by selecting a non-woven polyester web with a weight within the range of between about 2.5 and 4.5 ounces per square yard.

9. The method of claim 8, further characterized by
(a) said first selecting step is carried out by selecting a non-woven polyester web with a weight of 3.0 ounces per square yard.

10. The method of claim 1, further characterized by
(a) said second selecting step is carried out by selecting a polyurethane web having a thickness within the range of between about 0.10 and 0.03 inches.

11. The method of claim 10, further characterized by
(a) said second selecting step is carried out by selecting a polyurethane web having a thickness of 0.03 inches.

12. The method of claim 1, further characterized by
(a) said third selecting step is carried out by selecting a soft flexible polyvinyl chloride film having a thickness within the range of between about 0.002 and 0.02 inches.

13. The method of claim 12, further characterized by
(a) said third selecting step is carried out by selecting a polyvinyl chloride film having a thickness of 0.006 inches.

14. The method of claim 1, further characterized by
(a) said joining step is by needling carried out with a depth of penetration within the range of between about 0.20 and 0.92 inches.

15. The method of claim 14, further characterized by
(a) said depth of penetration is 0.3 to 0.4 (two barbs) inches.

16. The method of claim 1, further characterized by
(a) said joining step is by needling carried out with a degree of penetration of within the range of between about 200 and 2000 penetrations per square inch.

17. The method of claim 16, further characterized by
(a) said degree of penetration is 550 penetrations per square inch.

18. A laminate for use in wearing apparel, characterized by
(a) a fibrous web;
(b) a synthetic foamed resin web joined to said non-woven fibrous web to form a prelaminate;
(c) the exposed surface of said non-woven fibrous web on said pre-laminate being napped to form the internal surface of wearing apparel formed therefrom.
(d) a resin film web adhered to the exposed foam surface of said pre-laminate; and
(e) the exposed surface of said film web being creped.

19. The laminate of claim 18, further characterized by
(a) said creped film surface having an embossed pattern superimposed thereover.

20. The laminate of claim 18, further characterized by
(a) said fibrous web is non-woven polyester.

21. The laminate of claim 18, further characterized by
(a) said synthetic foamed resin web is polyurethane.

22. The laminate of claim 18, further characterized by
(a) said film is polyvinyl chloride.

23. The laminate of claim 20, further characterized by
(a) said non-woven polyester web has a weight within the range of between about 2.5 and 4.5 ounces per square yard.

24. The laminate of claim 23, further characterized by
(a) said non-woven polyester web has a weight of 3.0 ounces per square yard.

25. The laminate of claim 21, further characterized by
(a) said polyurethane web has a thickness within the range of between about 0.10 and 0.03 inch.

26. The laminate of claim 25, further characterized by
(a) the thickness of said polyurethane web is 0.03 inch.

27. The laminate of claim 23, further characterized by
(a) said polyvinyl chloride film has a thickness within the range of between about 0.002 and 0.02 inch.

28. The laminate of claim 27, further characterized by
(a) said polyvinyl chloride film has a thickness of 0.006 inch.

29. The laminate of claim 18, further characterized by
(a) said pre-laminate is joined together by needling with a density of penetration of within the range of between about 200 and 2000 penetrations per square inch.

30. The laminate of claim 29, further characterized by
(a) said density of penetration is 550 penetrations per square inch.

31. The laminate of claim 18, further characterized by
(a) said pre-laminate is joined together by needling at a depth of penetration of between the range of between about 0.20 and 0.92 inch.

32. The laminate of claim 31, further characterized by
(a) said depth of penetration is 0.3 to 0.4 (two barb) inch.

* * * * *